Feb. 7, 1939.  A. H. PROVENZANO  2,146,349
SPEED INDICATOR AND SIGNAL
Original Filed July 24, 1934  2 Sheets-Sheet 1

Anthony H. Provenzano, INVENTOR
BY Victor J. Evans & Co.
ATTORNEY

Feb. 7, 1939. A. H. PROVENZANO 2,146,349
SPEED INDICATOR AND SIGNAL
Original Filed July 24, 1934 2 Sheets-Sheet 2

Anthony H. Provenzano, INVENTOR
BY Victor J. Evans & Co.
ATTORNEY

Patented Feb. 7, 1939

2,146,349

UNITED STATES PATENT OFFICE 2,146,349

SPEED INDICATOR AND SIGNAL

Anthony H. Provenzano, Buffalo, N. Y.

Refiled for abandoned application Serial No. 736,730, July 24, 1934. This application July 7, 1936, Serial No. 89,424

1 Claim. (Cl. 200—80)

The invention relates to a speed indicator and signal and more especially to speed indicating devices for use on motor vehicles.

The primary object of the invention is the provision of a device of this character, wherein through the medium of variable colored signals, the operator of the motor vehicle or a pedestrain will be able to approximate the speed of travel of the said vehicle and thus warning the operator of the vehicle at intervals when exceeding speed limits at which the vehicle is traveling.

Another object of the invention is the provision of a device of this character, wherein the same is of novel construction and through the medium of an equalizer the said device will operate steadily and accurately and in the use thereof the operator of the vehicle and pedestrians will have cognizance of the approximate speed of travel of the vehicle, as the operator of the vehicle, through an indicator, will know the speed at which the vehicle is traveling, and also through the medium of signals such speed can be determined at a glance and thus the said operator will have dual indication, with the result that the vehicle can be held within certain speed limits for avoiding disobedience of traffic regulations.

A further object of the invention is the provision of a device of this character, wherein efficient indications of speed travel of a vehicle will be had through the medium of different colored lights, these being conveniently arranged at any desired point upon the vehicle for the purpose of observation by the public or for the observation of the driver of the vehicle in order to enable him to determine as to the approximate speed at which the vehicle is traveling.

A still further object of the invention is the provision of a device of this character which is simple in construction, thoroughly reliable and efficient in its operation, automatic in the working thereof, strong, durable, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claim hereunto appended.

This application is a substitution for abandoned application, S. N. 736,730, filed July 24, 1934.

In the accompanying drawings.

Similar reference characters indicate corresponding parts throughout the several views in the drawings.

Figure 1:
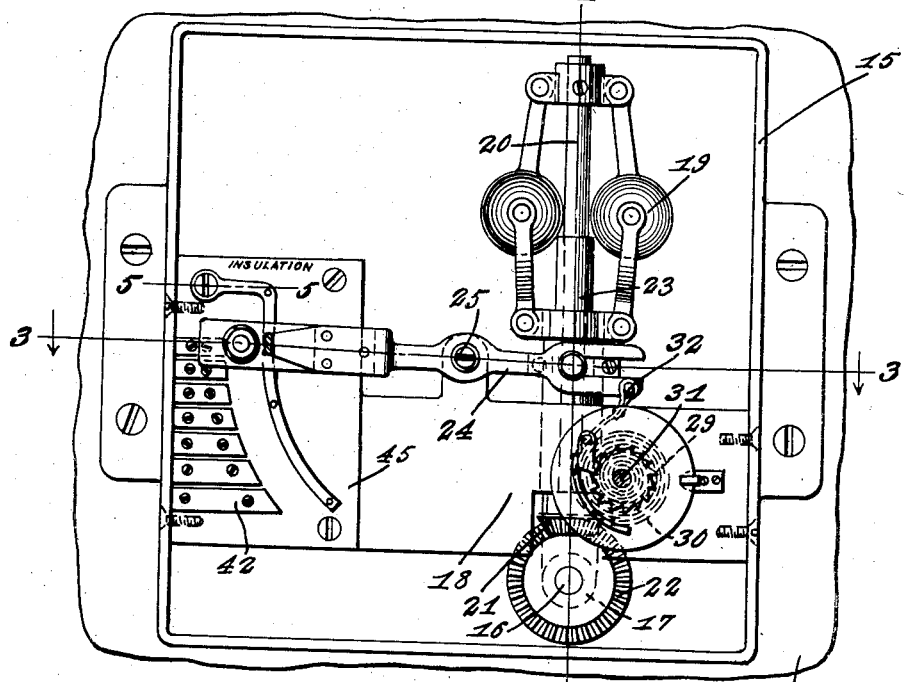
Figure 1 is a fragmentary elevation of the governor control circuit closer employed in the speed-indicating device.
Figure 2:
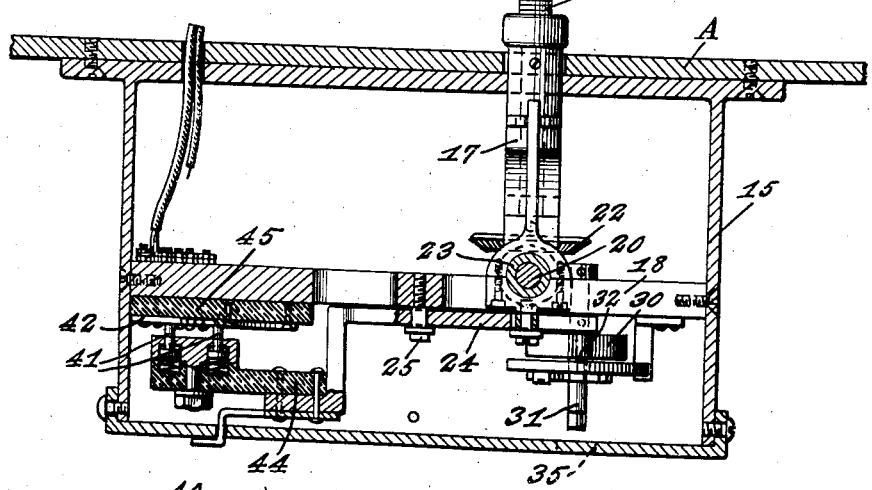
Figure 2 is a sectional view taken on the line 3—3 of Figure 1 looking in the direction of the arrows.
Figure 4:
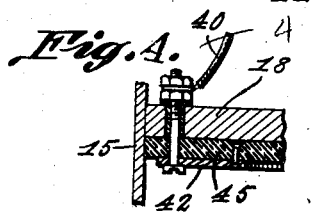
Figure 4 is a fragmentary sectional view on the line 5—5 of Figure 1.
Figure 3:
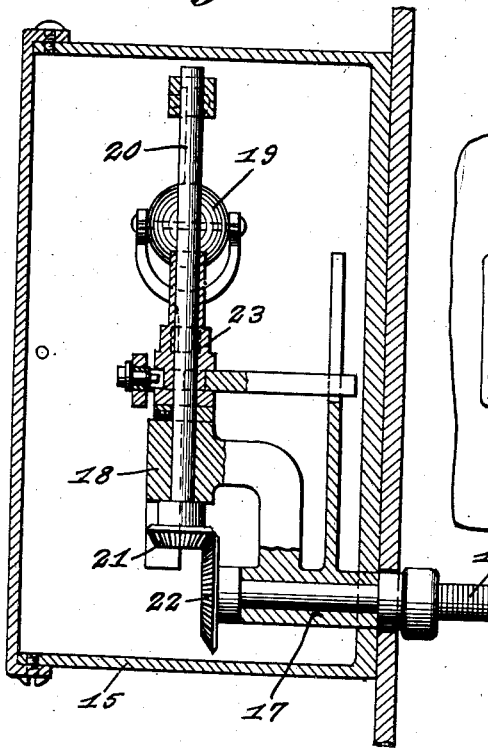
Figure 3 is a fragmentary sectional view taken on the line 4—4 of Figure 1.
Figure 6:
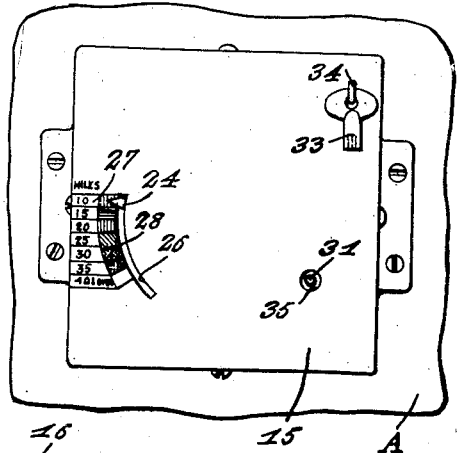
Figure 6 is an elevation of the indicator of the device.
Figure 5:
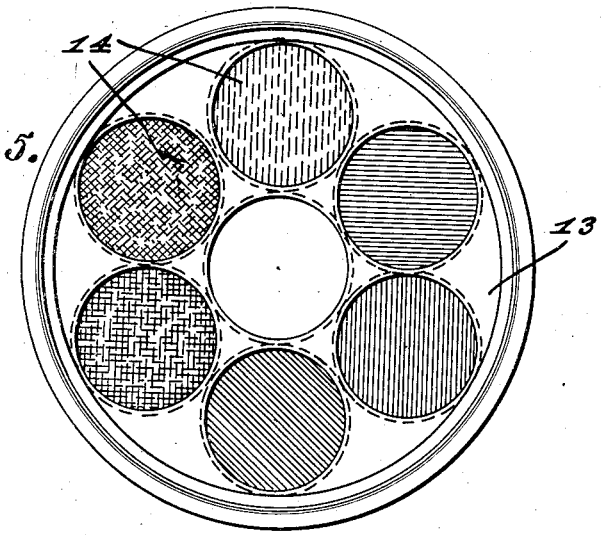
Figure 5 is a plan view of one of the signal boxes.

Referring to the drawings in detail, A designates generally a motor vehicle, in this instance, of the passenger or pleasure type and of standard construction. Adapted to be arranged upon this vehicle A, preferably upon the front and rear fenders thereof, are the signal boxes 10 and 11, respectively, although they may be otherwise arranged at the option of the user of the device. Each box includes preferably a circular housing 12 having a front 13 provided at the center and concentrically of the center light emitting lenses 14, these in their group being colored differently from each other so as to be distinguished one from the other. The signal box 10 at the front of the vehicle A is double faced and its rear panel 13 faces rearwardly so as to be visible to an operator when occupying the driver's seat within the vehicle and its front panel 13' is visible to pedestrians from the front of the vehicle, while the box 11 at the rear of the vehicle is visible to pedestrians from the rear only of the vehicle.

Located upon the dashboard interiorly of the body of the vehicle A at a convenient location for visibility by the driver of the vehicle is an indicator including a casing 15 and extended into this casing is a driven shaft 16 operated from the power shaft of the vehicle, the shaft 16 interiorly of the casing 15 being journaled, at 17, in a bracket 18 supporting a ball governor 19, its rotary arbor 20 being connected through the companion pinion 21 and gear 22 with the shaft 16. The governor 19 operates, through the medium of its shiftable sleeve 23 upon the arbor 20, an indicator pointer or hand 24 pivoted at 25 and extended through an arcuate slot 26 in the front of the casing 15 to coact with a scale 27 indicative of speeds of determined number of miles per hour. This scale also is supplemented by a colored chart 28, the colors thereof being alike to the respective colors of the lenses 14, so as to identify by signals, through determined colors, the speed of travel of the vehicle according to the number of miles per hour traveled by such vehicle.

Arranged within the casing 15 is what might be termed an equalizer comprising a tensioning spiral clock spring 29 arranged within the barrel 30, one end of the spring being connected to a winding arbor 31 and the other end connected, at 32, to the hand or pointer 24, the arbor 31 being adapted for the connection of a winding key 33 for the winding of the spring 29 should it become weak from continued use. The key 33 is suitably suspended upon a hook 34 upon the front of the casing 15 and is usable only by an authorized person, to have the spring properly tensioned to assure that the device is in unison with the speedometer as equipped in the vehicle. The key 33 is insertable through a keyhole 35 in the front of the casing 15 for engagement with the arbor 31 when it is required to increase the tension of the spring 29 for accuracy in the working of the device. If the occasion should arise to bring the indicator to inactive position it is necessary to disengage the gear 22 from the gear 21 or reset the indicator through the medium of a clutch (not shown) interposed in the shaft 16.

What is claimed is:

A speed indicator for a motor vehicle having a row of switch contacts built therewith comprising a driven shaft, a weighted arm governor actuated by said shaft, an element on said shaft and slidable by the governor, a switch arm movable over the contacts and having a bifurcated end engaging said element for actuation thereby, a winding spring having one end connected with the bifurcated end of the arm, a winding arbor having the other end of the spring connected thereto, and a key for separably engaging the arbor and effecting the winding of the said spring.

ANTHONY H. PROVENZANO.